United States Patent
Chen et al.

(10) Patent No.: US 7,609,856 B2
(45) Date of Patent: *Oct. 27, 2009

(54) SMOKE DETECTION METHOD BASED ON VIDEO PROCESSING

(75) Inventors: Chao-Ho Chen, Tai-Nan (TW); Yen-Hui Yin, Kaohsiung (TW); Cheng-Liang Kao, Tainan Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 99 days.

This patent is subject to a terminal disclaimer.

(21) Appl. No.: 11/938,786

(22) Filed: Nov. 13, 2007

(65) Prior Publication Data

US 2009/0123074 A1    May 14, 2009

(51) Int. Cl.
*G06K 9/00* (2006.01)
*H04N 7/18* (2006.01)

(52) U.S. Cl. .................. 382/103; 382/194; 348/143

(58) Field of Classification Search .................. 382/100, 382/103, 106, 107, 154, 155, 162, 165, 167, 382/168, 172, 181, 184, 194, 199, 203, 209, 382/218, 232, 254, 255, 274, 276, 286, 287, 382/305; 348/143, 165
See application file for complete search history.

(56) References Cited

U.S. PATENT DOCUMENTS

| 7,155,029 | B2 * | 12/2006 | King et al. | 382/100 |
| 7,245,315 | B2 * | 7/2007 | Sadok et al. | 348/165 |
| 7,256,818 | B2 * | 8/2007 | Sadok et al. | 348/143 |
| 7,280,696 | B2 * | 10/2007 | Zakrzewski et al. | 382/218 |
| 7,302,101 | B2 * | 11/2007 | Zakrzewski et al. | 382/218 |

\* cited by examiner

*Primary Examiner*—Seyed Azarian
(74) *Attorney, Agent, or Firm*—Winston Hsu (57) ABSTRACT

The static and dynamic characteristics of smoke are developed for extracting smoke pixels of an image and effective smoke detection. In static characteristic, a chromaticity-based analysis is employed to extract grayish pixels in the moving region from a monitored area. Then, a circumference-based disorder measurement in dynamic characteristic is developed to obtain the smoke pixels from the grayish pixels. To enhance the reliability of alarming, a fuzzy system is introduced to judge if the smoke will spread out by checking its growth-rate.

15 Claims, 6 Drawing Sheets

| Alarm strength (k) | | Number of time slices (x) | | |
|---|---|---|---|---|
| | | S | M | L |
| Number of smoke pixels (y) | S | S | M | L |
| | M | S | M | L |
| | L | S | M | L |
| | | M | L | L |

FIG. 6

SMOKE DETECTION METHOD BASED ON VIDEO PROCESSING

BACKGROUND OF THE INVENTION

1. Field of the Invention

The present invention relates to a smoke detection method, and more specifically, to a smoke detection method based on video processing.

2. Description of the Prior Art

Generally, the fire accident usually causes economical and ecological damage as well as endangering people's lives. To avoid the fire's disasters, many early fire-detection techniques have been explored and most of them are based on particle sampling, temperature sampling, relative humidity sampling, air transparency testing, in addition to the traditional ultraviolet and infrared fire detectors. However, most of the objects generate smoke before they catch fire and this motivates that the smoke-detection is employed to provide an early alarm for preventing fire accident effectively.

Almost all traditional smoke-detectors either must be set in the proximity of a fire or can't provide the additional information about the process of burning, such as the burning location, size, growing rate, and so on. Hence, they are not always reliable because energy emission of non-fires or byproducts of combustion, which can be yielded in other ways, may be detected by misadventure. This frequently results in false alarms. To provide more reliable information about smoke-detection, the vision-based approach is becoming more and more interesting.

Most of video-based fire-detection techniques are aimed at flame detection for the purpose of giving a fire alarm. In many practical situations, smoke comes earlier than flame in a burning process and therefore, smoke-detection will offer a more early alarm to a possible fire accident than flame-detection does. By noticing that smoke shapes have the property of self-similarity, the fractal encoding technique is introduced in conventional practice to extract the smoke region and is effective especially for using a monochrome video camera. In other prior art, based on determining the smoke edge regions whose wavelet subband energies decrease with time, these regions are then analyzed along with their corresponding background regions with respect to their RGB and chrominance values to achieve real-time detection of smoke.

To avoid being interfered by smoke-aliases, there are still other techniques in the prior art that employ both chromatic recognition and disorder measurement to improve the verification of real smoke with higher effectiveness. Anyway, the disorder measurement on pixel number of smoke-image difference between two continuous frames is not very effective.

SUMMARY OF THE INVENTION

The present invention provides a smoke detection method based on video processing. The method comprises capturing images in a monitored area; segmenting moving regions from the captured images, each moving region comprising a plurality of pixels; extracting a plurality of smoke pixels from the plurality of pixels in the moving regions according to a first rule; and determining whether the plurality of smoke pixels forms real smoke according to a second rule.

The present invention also provides a smoke detection method based on video processing. The method comprises capturing images in a monitored area and segmenting moving regions from the captured images, each moving region comprising a plurality of pixels; determining real smoke from the moving regions wherein the real smoke comprising a plurality smoke pixels; and giving an alarm according to the number of smoke pixels of the real smoke and the time slices for the real smoke spanning across by a fuzzy system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
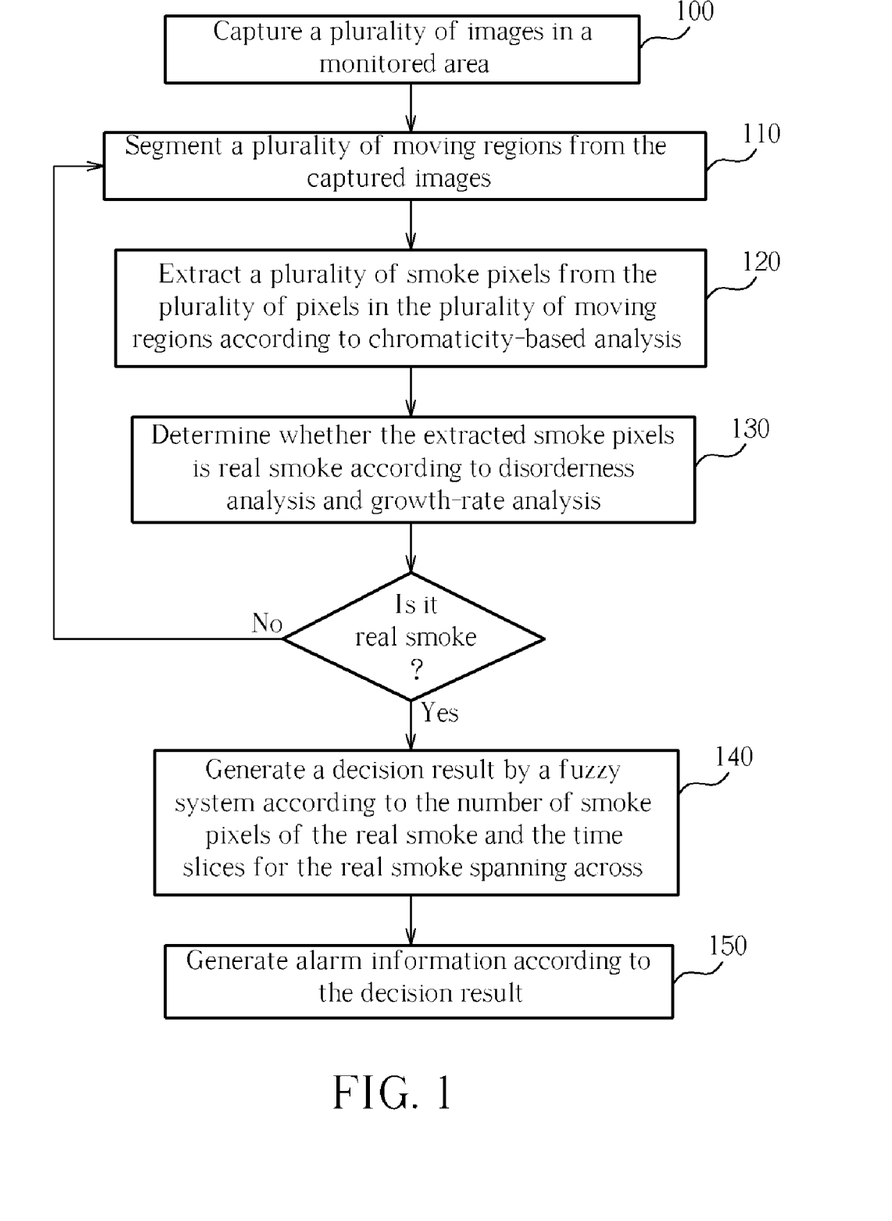
FIG. 1 is an illustration of flow chart of the smoke detection method based on video processing according to the present invention.

Please refer to FIG. 1. FIG. 1 is an illustration of flow chart of the smoke detection method based on video processing according to the present invention. The smoke detection method comprises the following steps:

Step 100: use an image capturing device to capture a plurality of images in a monitored area;

Step 110: compare the frame difference of successive captured images in Step 100 to segment a plurality of moving regions from the captured images, in which each moving region comprises a plurality of pixels;

Step 120: extract a plurality of smoke pixels from the plurality of pixels in the plurality of moving regions according to chromaticity-based analysis;

Step 130: determine whether the extracted smoke pixels in Step 120 is real smoke according to disorderness analysis and growth-rate analysis; if the extracted smoke pixels is not real smoke, execute Step 110;

Step 140: generate a decision result by a fuzzy system according to the number of smoke pixels of the real smoke and the time slices for the real smoke spanning across;

Step 150: generate the alarm information according to the decision result generated in Step 140.

Step 100 first teaches that images in a monitored area are captured by an image device which takes the images from the monitored area every fixed time interval, i.e., the plurality of images captured in Step 100 are successive images with fixed time interval and are friendly to the following analysis using the method according to the present invention. Moving regions are then located from these captured images (Step 110). Since smoke varies in its shape and size with time, by checking the frame difference of the successive images from the images captured in Step 110, it takes no great effort to segment many moving regions from every captured image, the detailed description of the frame difference technique being omitted here for brevity for its being simple for anyone skilled in the art.

Each of the plurality of moving regions segmented in Step 110 comprises a plurality of pixels, all of which being candidates for a smoke pixel to be examined by chromaticity-based analysis in Step 120. The smoke during the burning process usually displays grayish color, light-gray or dark-gray depending on the types of burning process. In other words, if RGB color model is implemented in the analysis, the values of three color components R, G, and B of a smoke pixel should be equal or so. The following condition (1) is used as a first decision function for smoke-pixel recognition, wherein α is a tolerance:

$$R \pm \alpha = G \pm \alpha = B \pm \alpha;  \quad \text{condition (1):}$$

After applying condition (1), the recognition of smoke pixel can further be judged with its intensity (I) by using the HSI color model. In the present invention, two sets of values denoting a light-gray region from L1 to L2 and a dark-gray region from D1 to D2 are defined and the intensity I of a pixel should fall in either the light-gray region or the dark-gray region to be verified as a smoke pixel. Therefore, the chromaticity-based analysis in Step 120 further uses the following condition (2) as the second decision function:

$$L1 \leq I \leq L2 \text{ or } D1 \leq I \leq D2; \quad \text{condition (2):}$$

If any of the pixels in a moving region in the captured image meets both condition (1) and condition (2), it is considered to be a smoke pixel. In other words, the moving regions segmented in the monitored area are highly possible to be real smoke, not other smoke-like objects. In the above condition, those values of α, L1, L2, D1, and D2 all depend on the statistical data of experiments and practically the range of the typical value of α is from 15 to 20. Typical values of light-gray and dark-gray range from 80 (=D1) to 150 (=D2) and 150 (=L1) to 220 (=L2), respectively.

In point of dynamics, the smoke spreads out basically in a way of diffusion process but it will be affected largely by airflows. In general, airflows will seriously affect the smoke's shape, moving speed, and moving direction of those smoke particles. To further improve the reliability of smoke detection, a dynamic analytical method is adopted for a next-step smoke verification. The fact is, the shape of the smoke changes at any time and therefore the moving regions formed by the plurality of extracted smoke pixels is verified by the disorderness decision rule as the following condition (3):

$$(SEP/STP) \geq STD; \quad \text{condition (3):}$$

In condition (3), SEP denotes the total circumferences of smoke regions segmented, STP is the quantity of smoke pixels extracted, and STD means a disorder threshold that distinguishes from other smoke-like objects, which is variable in various situations and dependent on the statistical data of experiments. The ration of SEP/STP defines the disorder of smoke in the exemplary embodiment according to the present invention. Condition (3) implies that if the disorder of a moving region (formed by a plurality of smoke pixels) is greater than a threshold STD, the plurality of smoke pixels is suggested to be the smoke.

In addition to the disorder analysis, the growth-rate is also a necessary condition for enhancing the reliability of smoke validation in Step 130. Owing to the diffusion process of smoke, the smoke region will obviously increase with increasing time sequence when the image device keeps capturing images with time. The growth-rate of the extracted smoke pixels by the chromatic decision rules introduced in Step 120 is defined as $$\Delta A_i = \left(\frac{dA}{dt}\right) = \frac{A_{i+k} - A_i}{t_{i+k} - t_i},$$

where $A_i$ means the number of smoke pixels extracted at time slice $t_i$ and $\Delta A_i$ means the number difference between smoke pixels at a second time slice $t_{i+k}$ and a first time slice $t_i$ divided by the time difference between of the second time slice $t_{i+k}$ and the first time slice $t_i$, in which the first time slice and the second time slice are successive times with fixed time interval. To obtain a more reliable measure of growth-rate, an average growth-rate $\overline{\Delta A_I}$ is used and defined by calculating the average of n times growth-rates $\Delta A_i$ as follows:

$$\overline{\Delta A_I} = \left(\left(\sum_{i=1}^{n} \Delta A_i\right) \bigg/ n\right).$$

With the basis of theory on the growth-rate discussed above, it is ready in Step 130 to perform the growth-rate decision rule on the moving regions formed by a plurality of smoke pixels extracted in Step 120 as the following condition (4):

$$(\text{times of } (D_g < \overline{\Delta A_I})) > N_d; \quad \text{condition (4):}$$

In condition (4), $D_g$ denotes a threshold of growth-rate and $N_d$ is a threshold of checking times, both of which are determined by the statistical data of experiments in various burning situations. If the number of that the average growth-rate is greater than $D_g$ is larger than $N_d$ during consecutive N checking times, the moving region formed by a plurality of captured smoke pixels is regarded as real smoke.

Figure 2:
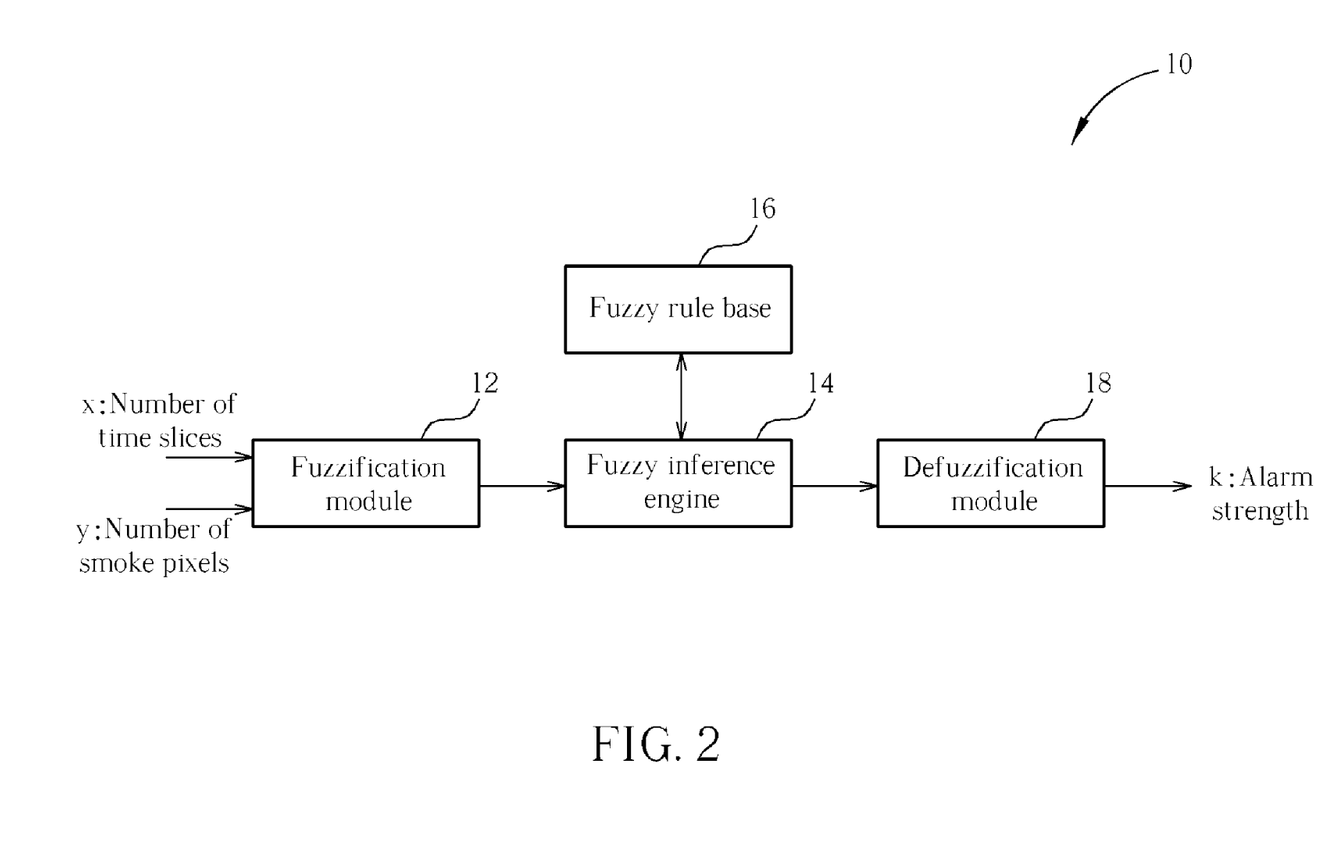
FIG. 2 is an illustration of a fuzzy system.
Figure 3:
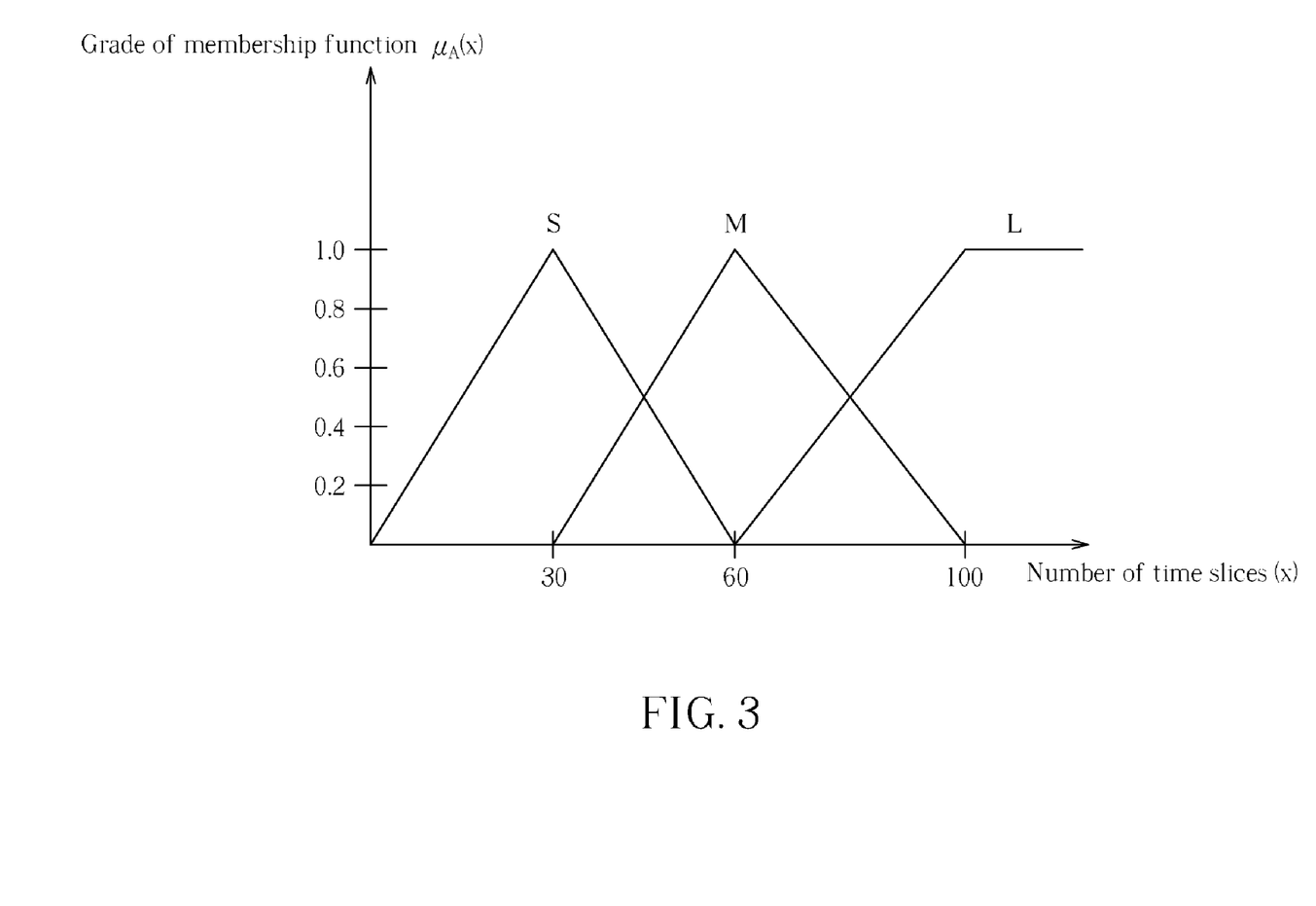
FIG. 3 is an illustration of the relation between membership function $\mu_A(X)$ and the number of time slices (x).
Figure 4:
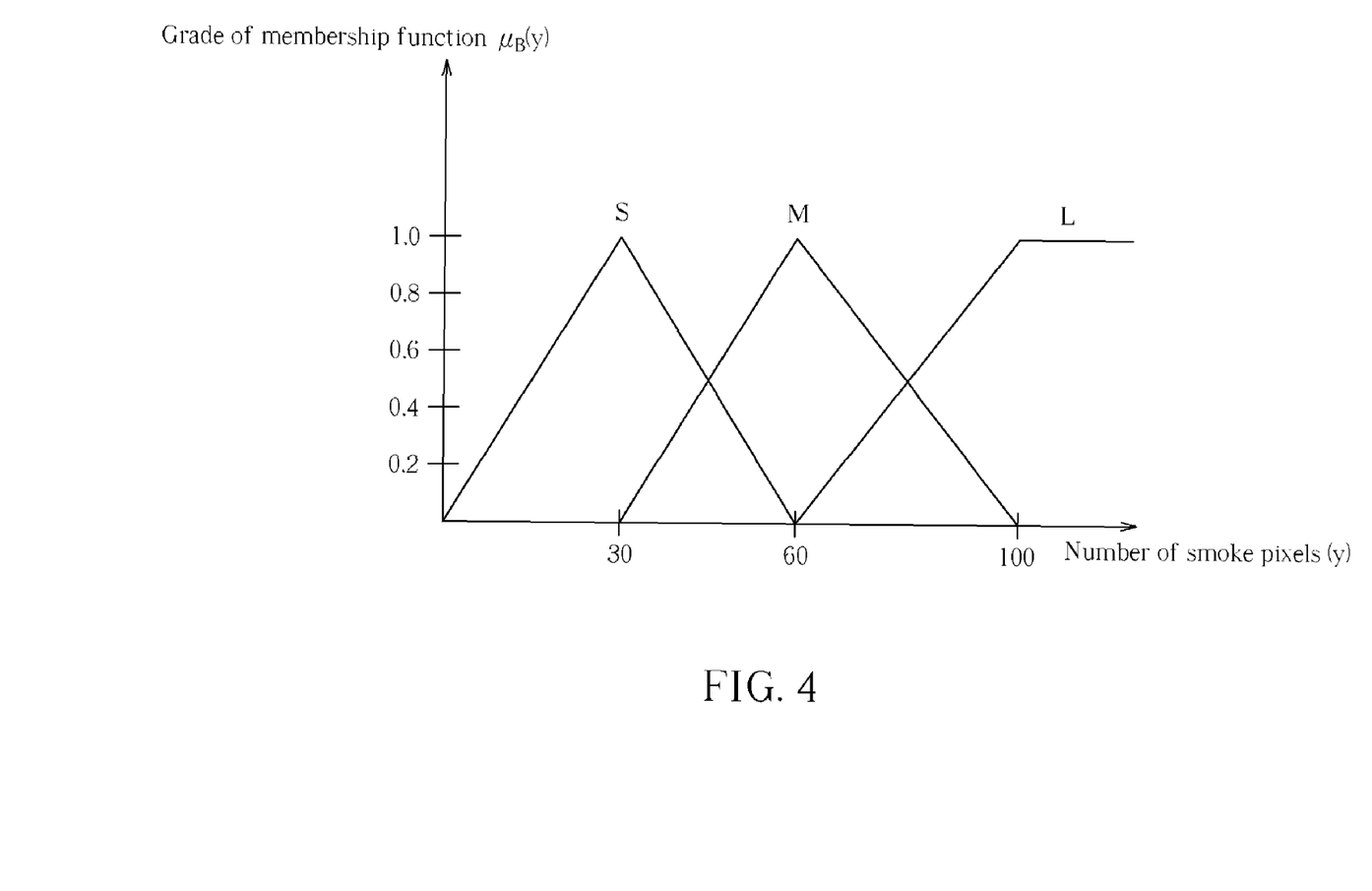
FIG. 4 is an illustration of the relation between membership function $\mu_B(y)$ and the number of smoke pixels (y).
Figure 5:
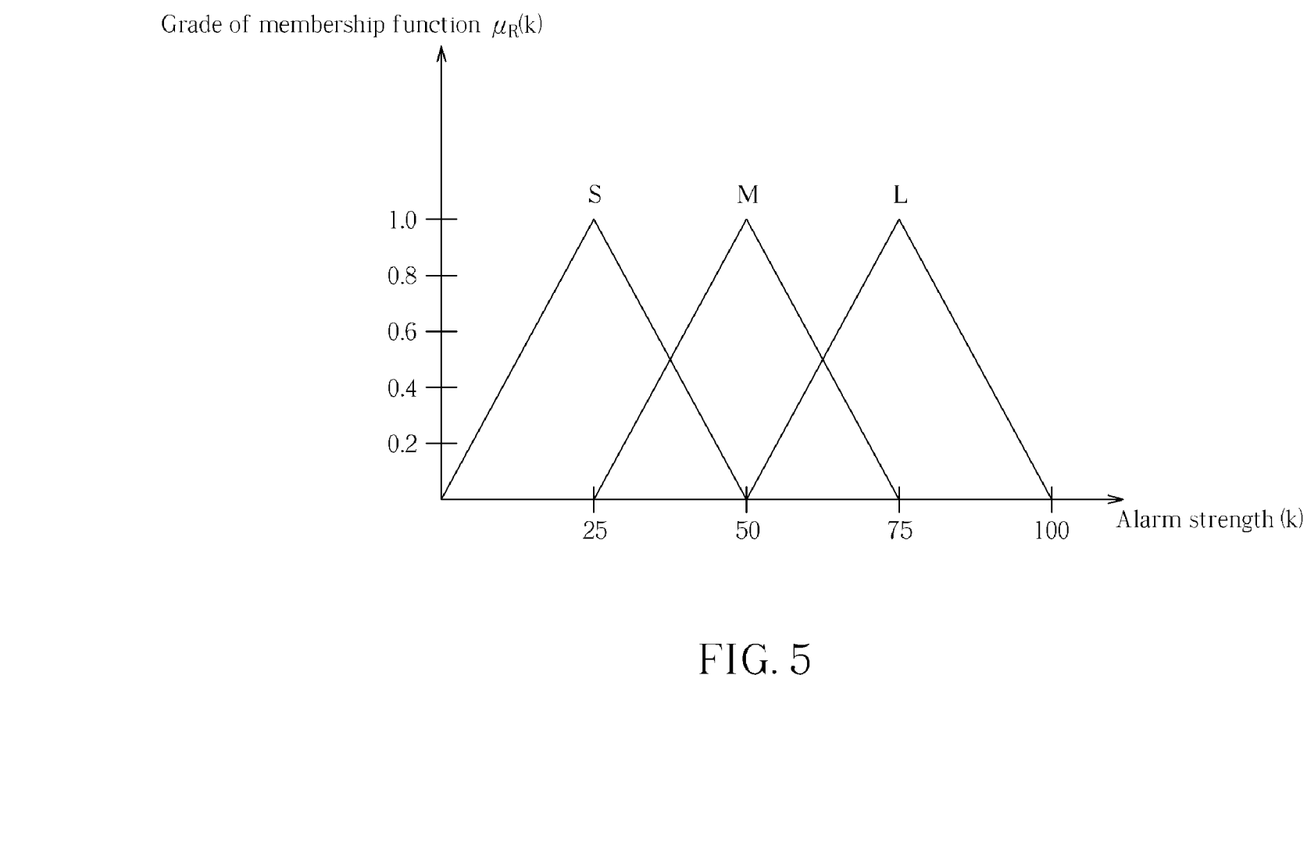
FIG. 5 is an illustration of the relation between membership function $\mu_R(k)$ of the fuzzy result and the alarm strength (k).
Figure 6:
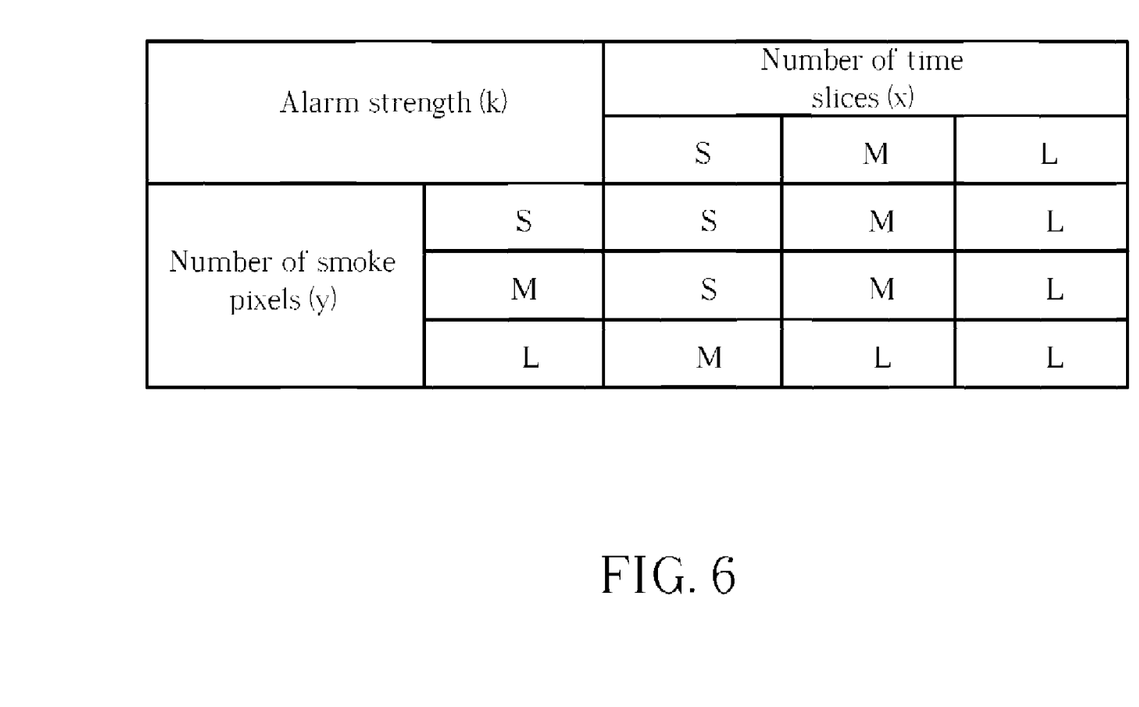
FIG. 6 is an illustration of the fuzzy rule base.

When the moving regions segmented in the monitored area is determined to be real smoke by using static analysis in Step 120 and dynamic analysis in Step 130, an alarm should be given if the smoke is confirmed as diffusive, whose quantity of smoke pixels increases with the burning time. In Step 140, a fuzzy system is implemented to check if the real smoke is going to spread out and likely to cause an accident so that an alarm can be given accordingly. In FIG. 2, the fuzzy system 10 comprises a fuzzification module 12, a fuzzy inference engine 14, a fuzzy rule base 16, and a defuzzification module 18. The number of smoke pixels and the number of time slices for the smoke are input for the fuzzification module 12, which is composed of membership function corresponding to fuzzy linguistic label. The fuzzy linguistic terms are represented by the degree of membership value ranging within the interval [0,1]. The number of time slices and number of smoke pixels are denoted by variables x and y respectively, and thus their membership functions A and B are described as $\mu_A(X)=A \rightarrow [0,1]$, and $\mu_B(y)=B \rightarrow [0,1]$. Please refer to FIG. 3 and FIG. 4. FIG. 3 is an illustration of the relation between membership function $\mu_A(x)$ and the number of time slices (x). FIG. 4 is an illustration of the relation between membership function $\mu_B(y)$ and the number of smoke pixels (y). In those triangular membership functions, S, M, and L, denote levels of "small", "medium", and "large", respectively. The fuzzy inference engine 14 then utilizes max-max composition, which is stored in the fuzzy rule base 16 to perform maximum operation on $\mu_A(X)$ and $\mu_B(y)$ to obtain a fuzzy result $\mu_R(k)=\max[\mu_A(x), \mu_B(y)]$, which determines alarm strength. The relation between membership function $\mu_R(k)$ of the fuzzy result and the alarm strength (k) is illustrated in FIG. 5 and a set of decision rules stored in the fuzzy rule base 16 is shown in FIG. 6.

Finally, in Step 150 a decision is made to give an alarm or not according to the fuzzy result generated in Step 140. $\mu_R(k)$ is first defuzzified with weighted average defuzzification method in the exemplary embodiment of the present invention and then the centroid of the aggregated alarm information is outputted as $$K = \frac{\sum_{i=1}^{N} \varphi_i \mu_{Ri}(k)}{\sum_{i=1}^{N} \mu_{Ri}(k)},$$

where the summation is carried over discrete values of the universe of discourse $\phi_i$ sampled at N points.

For reducing false alarm rate, a more effective smoke detection method based on pixel extraction by static and dynamic characteristics is developed in the present invention. Firstly, in static characteristic a chromaticity-based decision function is employed to extract grayish pixels in the moving region. Then, both measurements of circumference-based disorder and growth-rate of smoke pixels in dynamic characteristic are developed to verify the real smoke pixels from the grayish pixels. To give a reliable smoke alarm (or fire alarm), a fuzzy system is introduced to judge if the smoke will be spread out by checking its growth-rate.

Some concepts of the present invention have already been published in the proceedings of conference, as described below: Thou-Ho (Chao-Ho) Chen, Yen-Hui Yin, Shi-Feng Huang and Yan-Ting Ye, "The Smoke Detection for Early Fire-Alarming System Base on Video Processing", IEEE International Conference on Intelligent Information Hiding and Multimedia Signal Processing (IIH-MSP 2006), Pasadena, Calif., USA, Dec. 18-20, 2006, pp. 427-430. (Two authors of Thou-Ho (Chao-Ho) Chen and Yen-Hui Yin are inventors of the present invention).

Those skilled in the art will readily observe that numerous modifications and alterations of the device and method may be made while retaining the teachings of the invention.

What is claimed is:

1. A smoke detection method based on video processing comprising:
   capturing images in a monitored area by an image capturing device;
   segmenting moving regions from the captured images by a computing device, each moving region comprising a plurality of pixels;
   extracting a plurality of smoke pixels from the plurality of pixels in the moving regions according to a first rule by the computing device; and
   determining whether the plurality of smoke pixels forms real smoke by the computing device according to a disorderness and a growth-rate of the plurality of smoke pixels, comprising:
   determining the plurality of smoke pixels as real smoke by the computing device when a number of times which an average growth-rate of the smoke pixels is greater than a threshold of growth-rate exceeds a predetermined value within a time duration, wherein the average growth-rate of the smoke pixels is an average of the growth-rates of the smoke pixels, and each growth-rate of the smoke pixels denotes a difference between the numbers of smoke pixels at a first time slice and a second time slice divided by a time difference between the first time slice and the second time slice.

2. The smoke detection method of claim 1, wherein capturing images in a monitored area by the image capturing device comprises:
   capturing images in the monitored area by the image capturing device at a first time slice and a second time slice, wherein the first time slice and the second time slice are successive time slices with fixed interval.

3. The smoke detection method of claim 1, wherein segmenting moving regions from the captured images by the computing device comprises segmenting a moving region in a captured image by the computing device according to the successive images' frame difference in the captured images.

4. The smoke detection method of claim 1, wherein extracting a plurality of smoke pixels according to a first rule by the computing device comprises:
   updating the number of smoke pixels according to the color components' gray levels and the intensity (I) of HSI color model of the plurality of pixels by the computing device.

5. The smoke detection method of claim 4, wherein updating the number of the plurality of smoke pixels according to the color components' gray levels and the intensity (I) of HSI color model of the plurality of pixels by the computing device comprises:
   determining a pixel as a smoke pixel when red, green and blue gray levels of the pixel are approximately equal and when the intensity of the pixel is within a predetermined range.

6. The smoke detection method of claim 1, wherein determining the plurality of smoke pixels as real smoke by the computing device according to the disorderness and the growth-rate of the plurality of smoke pixels comprises:
   determining the plurality of smoke pixels as real smoke by the computing device when the ratio of circumference of the region formed by the smoke pixels and the number of smoke pixels is greater than a threshold.

7. The smoke detection method of claim 1, further comprising:
   giving an alarm when the plurality of smoke pixels is real smoke.

8. A smoke detection method based on video processing comprising:
   capturing images in a monitored area by an image capturing device and segmenting moving regions from the captured images by a computing device, each moving region comprising a plurality of pixels;
   determining real smoke from the moving regions by the computing device wherein the real smoke comprising a plurality smoke pixels, comprising:
   determining the plurality of smoke pixels as real smoke by the computing device according to a disorderness and a growth-rate of the plurality of smoke pixels when a number of times which an average growth-rate of the smoke pixels is greater than a threshold of growth-rate exceeds a predetermined value within a time duration, wherein the average growth-rate of the smoke pixels is an average of the growth-rates of the smoke pixels, and each growth-rate of the smoke pixels denotes a difference between the numbers of smoke pixels at a first time slice and a second time slice divided by a time difference between the first time slice and the second time slice; and
   giving an alarm according to the number of smoke pixels of the real smoke and the time slices for the real smoke spanning across by a fuzzy system.

9. The smoke detection method of claim 8, wherein capturing images in a monitored area by the computing device and segmenting moving regions from the captured images by the computing device comprises:
   capturing images in the monitored area at a first time slice and a second time slice by the image capturing device, wherein the first time slice and the second time slice are successive time slices with fixed interval; and segmenting a moving region in a captured image according to the successive images' frame difference in the captured images.

10. The smoke detection method of claim 8, wherein determining real smoke from the moving regions by the computing device comprises:

updating the number of the smoke pixels according to the color components' gray levels and the intensity (I) of HSI color model of the plurality of pixels.

11. The smoke detection method of claim 10, wherein updating the number of the smoke pixels according to the color components' gray levels and the intensity (I) of HSI color model of the plurality of pixels comprises:

determining a pixel as a smoke pixel when red, green and blue gray levels of the pixel are approximately equal and when the intensity of the pixel is within a predetermined range.

12. The smoke detection method of claim 8, wherein determining the plurality of smoke pixels as real smoke by the computing device according to the disorderness and the growth-rate of the plurality of smoke pixels comprises:

determining the plurality of smoke pixels as real smoke by the computing device when the ratio of circumference of the region formed by the smoke pixels and the number of smoke pixels is greater than a threshold.

13. The smoke detection method of claim 8, wherein giving an alarm according to the number of smoke pixels of the real smoke and the time slices for the real smoke spanning across comprises:

generating a fuzzy result by the fuzzy system according to the number of smoke pixels of the real smoke and the time slices for the real smoke spanning across;

defuzzifying the fuzzy result for generating the alarm strength; and giving the alarm according to the alarm strength.

14. The smoke detection method of claim 13, wherein generating a fuzzy result by a fuzzy system according to the number of smoke pixels of the real smoke and the time slices for the real smoke spanning across comprises:

performing the maximum operation on the number of smoke pixels of the real smoke and the time slices for the real smoke spanning across for generating the fuzzy result.

15. The smoke detection method of claim 13, wherein defuzzifying the fuzzy result for generating the alarm strength comprises:

defuzzifying the fuzzy result by weighted average defuzzification for generating the alarm strength.

\* \* \* \* \*